United States Patent
Fang et al.

(10) Patent No.: US 11,373,108 B2
(45) Date of Patent: Jun. 28, 2022

(54) REINFORCEMENT LEARNING IN REAL-TIME COMMUNICATIONS

(71) Applicant: Microsoft Technology Licensing, LLC, Redmond, WA (US)

(72) Inventors: Joyce S Fang, Bellevue, WA (US); Martin Ellis, Pittsburgh, PA (US); Ross Garrett Cutler, Clyde Hill, WA (US); David Yuheng Zhao, Redmond, WA (US); Thang Duong, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 200 days.

(21) Appl. No.: 16/507,933

(22) Filed: Jul. 10, 2019

(65) Prior Publication Data
US 2021/0012227 A1   Jan. 14, 2021

(51) Int. Cl.
*G06N 5/04* (2006.01)
*H04L 41/0631* (2022.01)
*H04L 43/0817* (2022.01)
*H04L 65/80* (2022.01)

(52) U.S. Cl.
CPC .......... *G06N 5/043* (2013.01); *H04L 41/065* (2013.01); *H04L 43/0817* (2013.01); *H04L 65/80* (2013.01)

(58) Field of Classification Search
CPC ... G06N 5/043; H04L 41/065; H04L 43/0817; H04L 65/80
See application file for complete search history.

(56) References Cited

U.S. PATENT DOCUMENTS

| | | |
|---|---|---|
| 7,400,588 B2 | 7/2008 | Izzat et al. |
| 9,660,921 B2 | 5/2017 | Changuel et al. |
| 10,234,848 B2 | 3/2019 | Mehr et al. |

(Continued)

FOREIGN PATENT DOCUMENTS

| | | |
|---|---|---|
| CN | 108737382 A | 11/2018 |
| CN | 109243021 A | 1/2019 |
| CN | 109255443 A * | 1/2019 |

OTHER PUBLICATIONS

He Jianshan, CN109255443—Method and Device for Training Depth Reinforcement Learning Model (WIPO machine translation), Jan. 1, 2019, pp. 1-5 (Year: 2019).*

(Continued)

*Primary Examiner* — Jonathan A Bui
(74) *Attorney, Agent, or Firm* — Schwegman Lundberg & Woessner, P.A.

(57) ABSTRACT

An agent interfaces with a sending computing device and a receiving computing device to automatically adjust one-way or two-way real-time audio and real-time video transmission parameters responsive to changing network conditions and/or application requirements. The agent incorporates a reinforcement learning model that adjusts transmission parameters to maximize an expected value of a sum of future rewards; the expected value of the sum of future rewards is based on a current state of the sending computing, a current action (e.g. a current set of transmission parameters) at the sending computing device and a reward provided by the receiving computing device. The reward is representative of a user-perceived quality of experience at the receiving computing device.

19 Claims, 10 Drawing Sheets

(56) References Cited

U.S. PATENT DOCUMENTS

| | | | | |
|---|---|---|---|---|
| 10,581,736 | B1* | 3/2020 | Choudhury | H04L 41/14 |
| 10,700,855 | B2* | 6/2020 | Hong | G06N 3/006 |
| 10,938,650 | B1* | 3/2021 | Hermoni | G06F 11/0787 |
| 2011/0306305 | A1* | 12/2011 | Huang | H04L 41/5009 |
| | | | | 455/67.11 |
| 2013/0286879 | A1* | 10/2013 | ElArabawy | H04W 28/0289 |
| | | | | 370/252 |
| 2016/0223218 | A1 | 8/2016 | Barrett | |
| 2018/0082213 | A1* | 3/2018 | McCord | G06N 20/00 |
| 2018/0129974 | A1 | 5/2018 | Giering et al. | |
| 2018/0165602 | A1 | 6/2018 | Van seijen et al. | |
| 2020/0065704 | A1* | 2/2020 | Nag | G06V 10/82 |
| 2020/0099733 | A1* | 3/2020 | Chu | H04L 65/605 |
| 2020/0106822 | A1* | 4/2020 | Roncero Izquierdo | |
| | | | | H04L 65/604 |
| 2020/0162535 | A1* | 5/2020 | Ma | G06N 3/08 |
| 2020/0204484 | A1* | 6/2020 | Altman | H04L 47/125 |
| 2020/0279017 | A1* | 9/2020 | Norton | G06F 16/36 |
| 2021/0081753 | A1* | 3/2021 | Ie | G06N 3/063 |
| 2021/0099517 | A1* | 4/2021 | Friedrich | H04L 67/1029 |
| 2021/0300198 | A1* | 9/2021 | Choi | G06N 3/0454 |
| 2021/0397959 | A1* | 12/2021 | Pietquin | G06N 3/0445 |

OTHER PUBLICATIONS

"Artificial Intelligence in Real Time Communications 2018: AI and Machine Learning Opportunity and Challenges in Speech and Video Conferencing Technologies", Retrieved From: https://web.archive.org/web/20181017144651/https:/www.businesswire.com/news/home/20181017005452/en/Artificial-Intelligence-Real-Time-Communications-2018-AI, Oct. 17, 2018, 3 Pages.

Akhtar, et al., "Oboe: Auto-tuning Video ABR Algorithms to Network Conditions", In Proceedings of the Conference of the ACM Special Interest Group on Data Communication, Aug. 20, 2018, 15 Pages.

Hargrave, Christian, "WebRTC AI Solution wants to Optimize your Calling Experience", Retrieved From: https://appdevelopermagazine.com/webrtc-ai-solution-wants-to-optimize-your-calling-experience/, Mar. 15, 2018, 10 Pages.

Mao, et al., "Neural Adaptive Video Streaming with Pensieve", In Proceedings of Conference of ACM Special Interest Group on Data Communication, Aug. 21, 2017, pp. 197-210.

Vega, et al., "A Review of Predictive Quality of Experience Management in Video Streaming Services", In Journal of IEEE Transactions on Broadcasting, vol. 64, Issue 2, Jun. 2018, 13 Pages.

Yeo, et al., "Neural Adaptive Content-aware Internet Video Delivery", In Proceedings of the 13th USENIX Symposium on Operating Systems Design and Implementation, Oct. 8, 2018, 19 Pages.

"Application Filed in Indian Patent Office No. 201741011863", Filed Date: Mar. 31, 2017, 51 Pages.

"International Search Report and Written Opinion Issued in PCT Application No. PCT/US20/036541", dated Sep. 21, 2020, 14 Pages.

Tang et al., "Multiuser Video Streaming Rate Adaptation: A Physical Layer Resource-Aware Deep Reinforcement Learning Approach", In repository of arXiv:1902.00637v1, Feb. 2, 2019, 29 Pages.

Tran et al., "Real-Time State-Dependent routing based on User Perception", In Proceedings of International Conference on Communications and Information Technology, Mar. 29, 2011, pp. 160-166.

Tran et al., "User QoE-based adaptive routing system for future Internet CDN", In Proceedings of Computing, Communications and Applications Conference, Jan. 11, 2012, pp. 90-95.

* cited by examiner

REINFORCEMENT LEARNING IN REAL-TIME COMMUNICATIONS

BACKGROUND

Bandwidth estimation, congestion control, and video quality optimization for real-time communication (e.g., voice and video conference) remains a difficult problem due to often changing network conditions and application requirements. Delivery of real-time media with high quality and reliability (e.g., end-user quality of experience) requires continual updates to react to new application requirements and network behaviors. The process of continual updates can be a slow process that results in a degraded end-user experience.

It is with respect to these and other general considerations that various aspects of the present disclosure are made. Further, although relatively specific problems and examples of solving those problems may be discussed herein, it should be understood that the examples should not be limited to solving the specific problems identified in the background or elsewhere in this disclosure.

SUMMARY

The present disclosure is generally directed to systems and methods to implement reinforcement learning in real-time communications. Certain aspects of the present disclosure are directed to reinforcement learning to optimize user-perceived quality in real-time audio and video communications. An agent interfaces with a sending computing device and a receiving computing device to automatically adjust real-time audio and video transmission parameters responsive to changing network conditions and/or application requirements. The sending computing device transmits real-time audio and/or video data. The receiving computing device receives the real-time audio and video transmissions from the sending device and determines an actual user-perceived quality of experience (QoE), which is provided to the agent as a reward. The agent incorporates a reinforcement learning model that includes a control policy and a state-action value function. The agent observes a current state of the sending computing device and determines an estimate of the expected value of the sum of future rewards based on the current state, the current action (e.g., the current adjustment, or set of adjustments, made to transmission parameters at the sending computing device), and the reward provided by the receiving computing device. Based on a goal of maximizing the expected value of the sum of future rewards, the agent adjusts the control policy. Adjustments in the control policy change the action applied to the real-time audio and/or video data.

An aspect of the present disclosure is directed to methods, systems and articles of manufacture that optimize expected user-perceived QoE in real-time communications. This aspect includes determining a current state of a sending computing device as well as current action of the sending computing device; the current action comprising a plurality transmission parameters. This aspect further includes transmitting a real-time communication from the sending computing device to a receiving computing device. The real-time communication includes one or both of a real-time audio communication and a real-time video communication. Further still, a reward, e.g., a QoE metric, is determined at the receiving computing device based on one or more parameters of the transmitted real-time communication received at the receiving computing device. An expected value of a sum of future rewards is determined based on the current state, the current action and the reward and at least one of the plurality of transmission parameters of the sending computing device is changed to maximize the expected value of the sum of future rewards.

An aspect of the present disclosure is directed methods, systems and articles of manufacture that train a reinforcement learning model to optimize expected user-perceived QoE in real-time communications. This aspect includes determining a current state of a sender and providing the current state to an agent in communication with the sender. This aspect further includes determining a current action of the sender; the current action is known by the agent and comprises a plurality a transmission parameters. This aspect further includes transmitting a real-time communication from the sender to a receiver. The real-time communication includes one or both of a real-time audio transmission or a real-time video transmission. This aspect further includes receiving, from the receiver, at the agent, a reward determined at the receiver. The reward is based on one or more parameters associated with the real-time communication received at the receiver. The agent determines an expected value of a sum of future rewards based on the current state, the current action and the reward and directs the changing of at least one of the plurality of transmission parameters to maximize the expected value of the sum of future rewards. The training can be performed in a simulated environment, an emulated environment or a real network environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
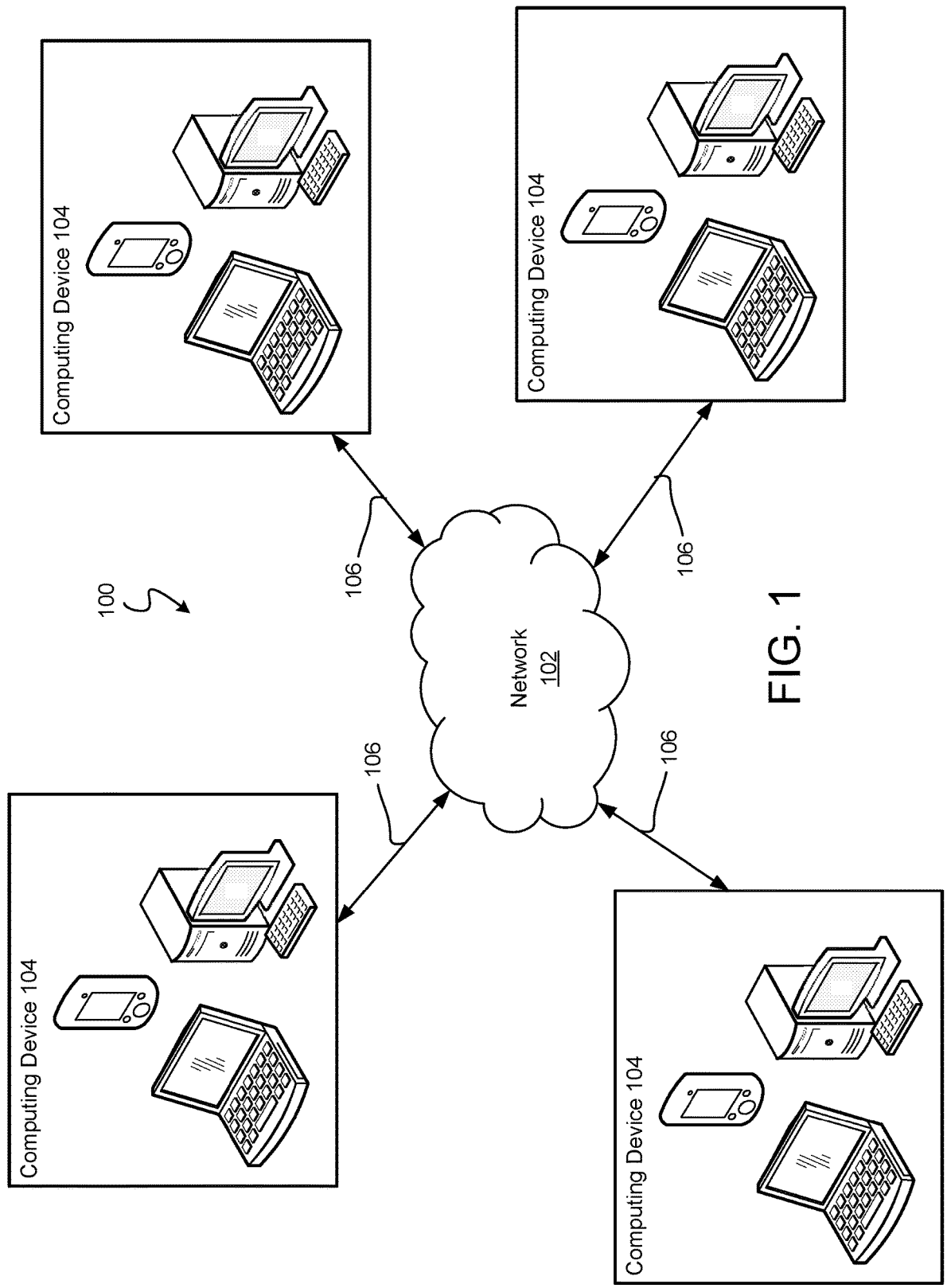
FIG. 1 illustrates an environment in which reinforcement learning in real-time communications as disclosed herein can be practiced.

Various aspects of the disclosure are described more fully below with reference to the accompanying drawings, which form a part hereof. Different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure is generally directed to systems and methods to implement reinforcement learning in real-time communications. Certain aspects of the present disclosure are directed to reinforcement learning to optimize user-perceived quality in real-time audio and video communications. An agent interfaces with a sending computing device and a receiving computing device to automatically adjust real-time audio and video transmission parameters responsive to changing network conditions and/or application requirements. The sending computing device transmits real-time audio and/or video data. The receiving computing device receives the real-time audio and video transmissions from the sending device and determines an actual user-perceived quality of experience (QoE), which is provided to the agent as a reward. The agent incorporates a reinforcement learning model that includes a control policy and a state-action value function. The agent observes a current state of the sending computing device and determines an estimate of the expected value of the sum of future rewards based on the current state, the current action (e.g., the current adjustment, or set of adjustments, made to transmission parameters at the sending computing device), and the reward provided by the receiving computing device. Based on a goal of maximizing the expected value of the sum of future rewards, the agent adjusts the control policy. Adjustments in the control policy change the action applied to the real-time audio and/or video data.

Accordingly, the present disclosure provides a plurality of technical benefits including, but not limited to a continuously updated reinforcement learning model that is immediately responsive to adjust real-time audio and video transmission parameters of a sending computing device based on a goal of maximizing the expected value of the sum of future rewards. The real-time audio and video transmission parameters are immediately adjusted to respond to changing network conditions and/or application requirements. Degradation of transmitted real-time audio and video streams, which could occur under a previously used process of hand-coding reactive updates to data transmissions parameters as a counter to the degradation, is minimized.

Referring to FIG. 1, an environment 100 for practicing reinforcement learning in real-time communications is illustrated. The environment 100 includes a network 102 through which a plurality of computing devices 104 communicate via various communication links 106. The term "real-time" refers to data processing in which received data is processed by the computing device almost immediately, e.g., a level of computing device responsiveness that a user senses as sufficiently immediate or that enables the computing device to keep up with some external process.

The network 102 is any type of wire and/or wireless network that can transmit, receive and exchange data, voice and video traffic. Examples of networks include local area networks (LANs) that interconnector endpoints in a single domains and wide area networks (WANs) that interconnector multiple LANs, as well as subnetworks, metropolitan area networks, storage area networks, personal area networks (PANS), wireless local area networks (WLANs), campus area networks (CANS), virtual private networks (VPNs), passive optical networks and the like.

The computing devices 104 comprise the endpoints of the network 102. The computing devices 104 can comprise one or more general purpose or special purpose computing devices. Such devices can include, for example, personal computers, server computers, hand-held or laptop devices, multiprocessor systems, microcontroller-based systems, set top boxes, programmable consumer electronics, network PCs, minicomputers, mainframe computers, cell phones, personal digital assistants (PDAs), gaming devices, printers, appliances, media centers, automobile-embedded or attached computing devices, other mobile devices, distributed computing environments that include any of the above systems or devices, and the like. Further details regarding computing devices are described in FIGS. 6-9.

Communications between computing devices 104 travel over the links 106. The links can include any type of guided or unguided transmission media that is capable of transmitting data, voice and/or video from one computing device 104 to another. Guided media transmits signals along a physical path. Examples of guided media include twisted pair cables, coaxial cables, optical fibers and the like. Unguided media transmits signals without the use of physical means to define the path the signals take. Examples of unguided media includes radiowaves, microwaves, infrared waves and the like.

Figure 2A:
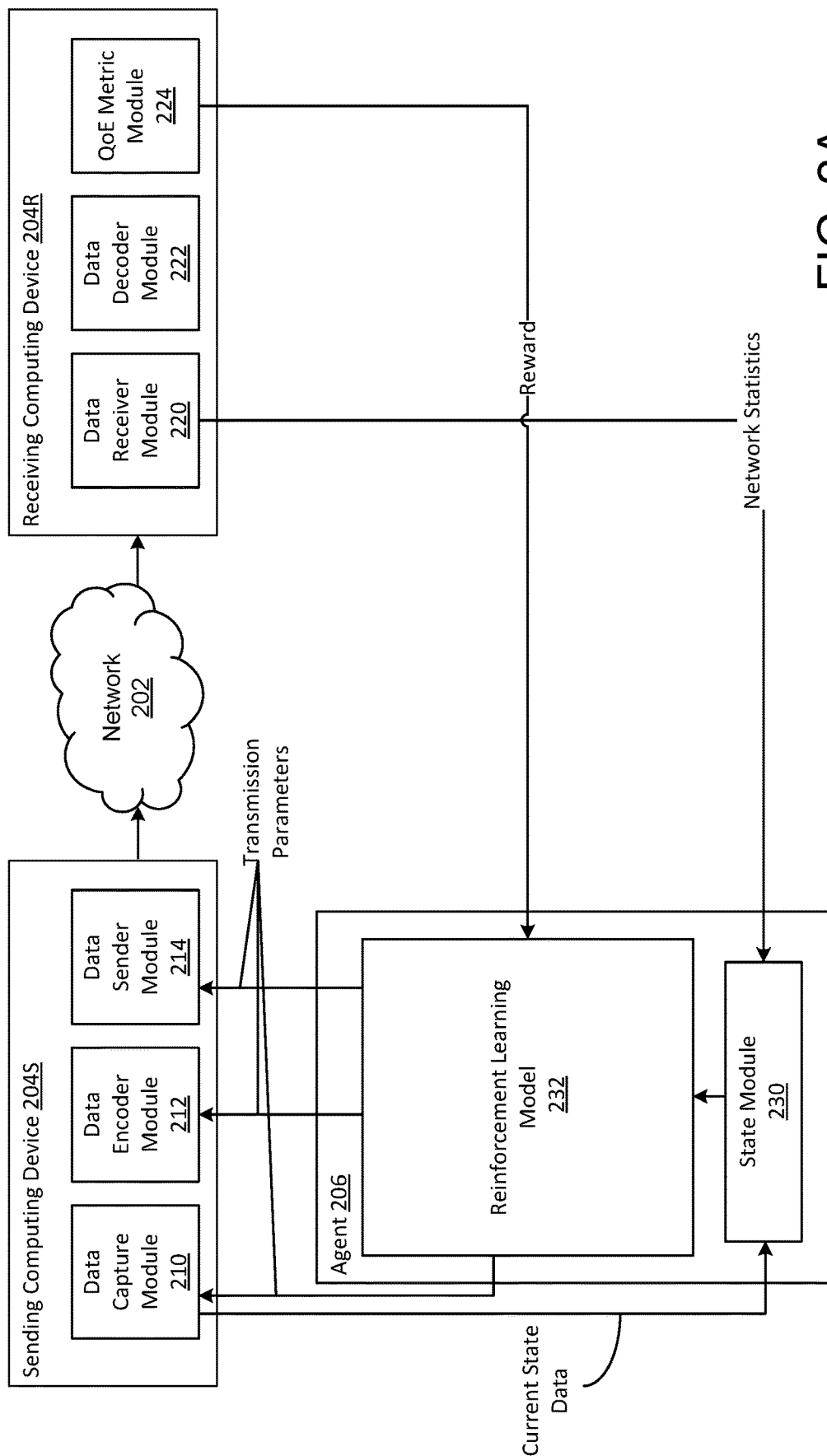
FIGS. 2A-2C illustrate additional details of an environment in which reinforcement learning in real-time communications herein can be practiced.
Figure 2B:
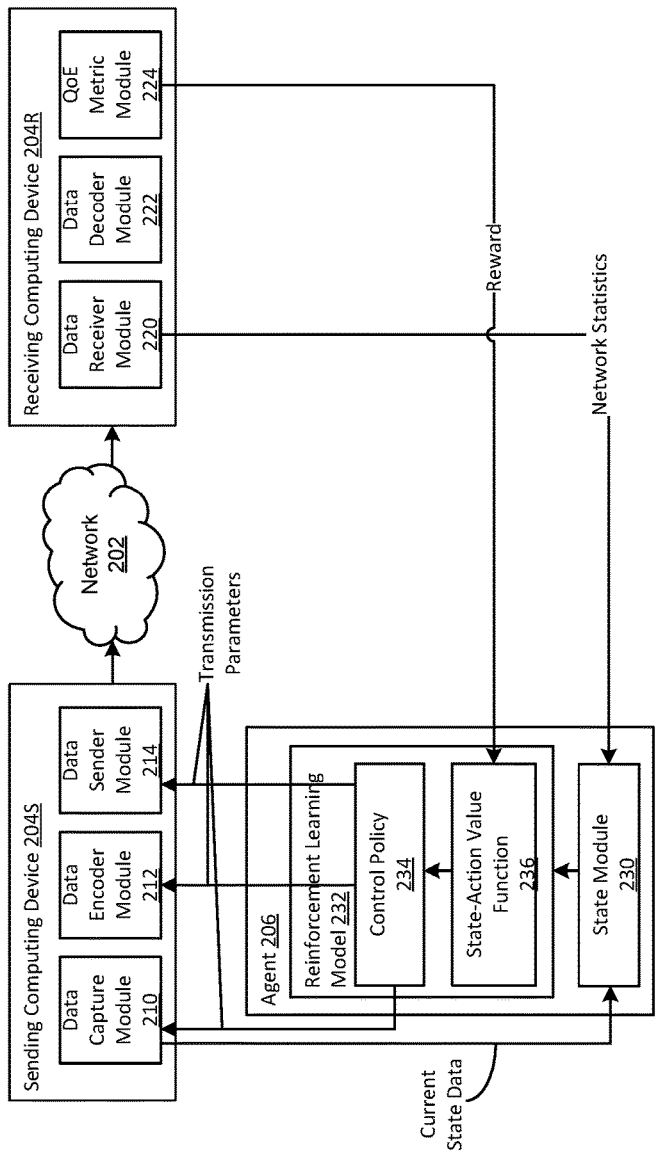

FIGS. 2A-2B illustrate an environment 200 that, for illustration purposes, includes a single sending computing device 204S and a single receiving computing device 204R that communicate in real-time over a network 202 via links 206. While the sending computing device 204S is shown as including only sending capability it should be realized that the sending computing device 204S can also operate as a receiving computing device. Similarly, receiving computing device 204R can also operate as a sending computing device. As such, two-way real-time communications can occur between sending computing device 204S and receiving computing device 204R. The environment 200 is in real-time communication with an agent 206 to implement reinforcement learning based on the real-time communication of data, which can include voice data and video data. The reinforcement learning optimizes expected user-perceived quality in real-time communications by maximizing the expected value of the sum of future rewards. The agent 206 can comprise coding or an application that resides on one or both of the sending computing device 204S and the receiving computing device 204R. The agent 206 can also comprises coding or an application that resides on a computing device distinct from the sending computing device 204S or receiving computing device 204R such as a server computing device, cloud computing device and the like.

As shown, the sending computing device 204S includes a data capture module 210, a data encoder module 212 and a data sender module 214. The data capture module 210 captures state data that is representative of a current observed state of the sending computing device 204S. In the context of real-time audio and video communications, the current observed state can include observed sending parameters that affect the transmission of the real-time audio data and the real-time video data. The observed sending parameters can include, for example, resolution, bitrate, framerate, streams-to-send, codec (encoding/decoding), a user's physical environment (e.g., darkness/light levels, background noise, motion, etc.) or any other parameter than can affect real-time data transmission. The data encoder module 212 of the sending computing device 204S converts the state data into a specified format for real-time transmission over the network 202. The data sender module 214 sends the formatted state data onto the network 202 in real-time.

The receiving computing device 240R includes a data receiver module 220, a data decoder module 222, and a QoE metrics module 224. The data receiver module 220 receives the formatted state data from the network 202 in real-time and outputs network statistics to the agent 206. Examples of network statistics include loss, jitter, round-trip time (RTT) also known as network delay, received rate, packet size, packet type, received timestamp, sender timestamp, burst lengths in packet losses, gaps between packet losses or any other network statistic that can be used in assessing the quality of the audio and video data received). The data decoder module 222 performs the reverse of the data encoder module 212 and extracts the received state data in real-time from the formatted state data.

The QoE metrics module 224 determines one or more of a Quality of Experience (QoE) metric based on the extracted state data. The QoE metric is representative of the user-perceived quality of the received state data as determined by a QoE machine learning model, such as a deep neural network (DNN) or other appropriate model. The QoE machine learning model analyzes various reception parameters such as the payload of the received audio and video data streams, wherein the payload is the part of the received data that is the actual intended message. Analysis of the payload of the audio and video streams can include the use of one or more pre-defined objective models that approximate the results of a subjective quality assessment (e.g., a human observers rating of the quality). In certain examples, the objective models can include one or more models for assessing real-time audio quality (e.g., Perception Evaluation of Audio Quality (PEAQ) models, PEMO-Q models, Signal-to-Noise Ratio (PSNR) models or any other objective model that can assess a received real-time audio signal). In certain examples, the objective models can include one more models for assessing real-time video quality (e.g., Full Reference (FR) models, Reduced Reference (RR) models, No-Reference (NR) models, Peak Signal-to-Noise Ratio (PSNR) models, Structural Similarity Index (SSIM) models or any other model that can assess a received real-time video signal).

In certain aspects, the QoE machine learning model can additionally analyze the network statistics and statistics of the receiving computing device 204R as reception parameters to determine the one or more QoE metrics. As mentioned herein, examples of network statistics include loss, jitter, round-trip time (RTT) also known as network delay, received rate, packet size, packet type, received timestamp, sender timestamp, burst lengths in packet losses, gaps between packet losses or any other network statistic that can be used in assessing the quality of the audio and video data received). Examples of statistics of receiving computing device 204R include display size, display window size, device type, whether a hardware or software encoder/decoder are used and the like. In certain aspects, the QoE machine learning model can additionally analyze user (e.g. human) feedback as reception parameters to determine the one or more QoE metrics. User feedback can be provided, for example, through user ratings or surveys to indicate their personal quality of experience, e.g., what the user thought of the quality of the audio and video received at the receiving computing device 204R. The determined one or more QoE metrics representative of user-perceived audio and/or video quality are communicated to the agent 206.

The agent 206 includes a state module 230 and a reinforcement learning model 232. In certain aspects, the reinforcement learning model 232 can incorporate any suitable reinforcement learning algorithm (a learning algorithm wherein an action takes place, the consequences are observed, and the next action considers the results of the first action based on a reward signal). The reinforcement learning algorithm can comprise, for example, actor-critic, q-learning, policy gradient, temporal difference, monte-carlo tree search or any other reinforcement learning algorithm suitable to the data involved. The reinforcement learning model 232 actively controls, in real-time, data transmission parameters of the sending computing device 204S.

Figure 2C:
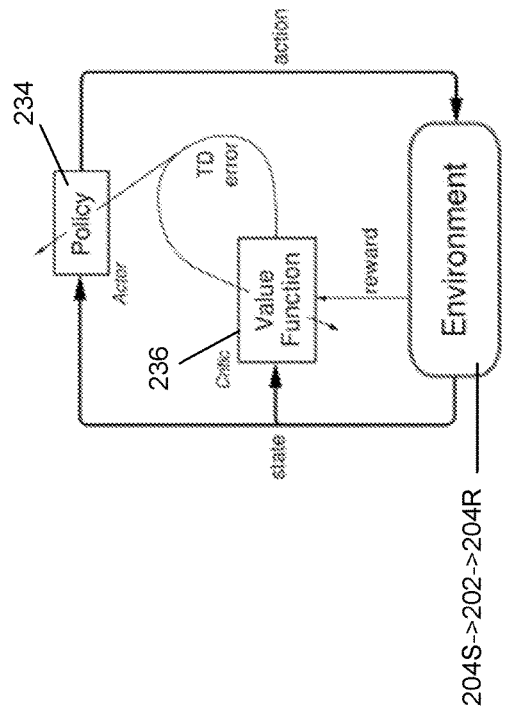

FIG. 2B illustrates an example of an actor-critic reinforcement learning model 232 that includes a control policy 234 and a state-action value function 236 with FIG. 2C providing a an example of an actor-critic architecture. Actor-critic reinforcement learning is a temporal-difference learning method wherein the control policy 234 is independent of the estimated state-value function 236, which in the present context is the expected value of the sum of future rewards. The control policy 234 comprises the actor because it is used to select actions, e.g. the data transmission parameters of the sending computing device, and the state-value function 236 is the critic because it criticizes the actions made by the control policy 234. The state-value function 236 learns about and critiques the current control policy 234.

The control policy 234 comprises a first machine learning model within the agent 206, such as a neural network, that produces one or more output actions in the form of one or more changes to one or more of the data transmission parameters used by the sending computing device 204S. The output actions are designed to optimize the expected user-perceived quality (QoE) of the of the audio and video data based on the maximization of the expected value of the sum of future rewards as determined by the state-action value function 236. Examples of data transmission parameters include send rate, resolution, frame rate, object events provided to a Quantization Parameter (QP), forward error correction (FEC) or any other controllable parameter that can be used to modify the quality of the transmission of the state data from the sending computing device 204S to the receiving computing device 204R.

The state-action value function 236 comprises a second machine learning model within the agent 206, such as a neural network, whose value function is trained to predict or estimate the expected value of the sum of future rewards. The expected value of the sum of future rewards is determined based on the current state of the sending computing device, the current action (e.g., the current transmission parameters used to transmit the real-time audio and/or video data) and the reward provided by the receiving computing device. The control policy adjusts output actions responsive to the expected value determination. The control policy 234 can be trained together with the state-action value function 236 or can be obtained based on an already trained state-action value function 236.

In certain aspects, during training of the actor-critic reinforcement learning model 232 of FIGS. 2B-2C, the agent 206 need not always follow the action of the control policy 234. Rather, the agent 206 can explore other actions (e.g., other modifications to data transmission parameters of the sending computing device 204S), which allows the agent 206 to improve the reinforcement learning model 232. The agent 206 can explore other actions through one or more exploration strategies, for example, epsilon-greedy.

In certain aspects, the control policy 234 of the reinforcement learning model 232, can be separated from its learning environment and be deployed as a real-time model in a client (e.g., a sending computing device and/or a receiving computing device). Transfer to a real-time model can be achieved through with one or more model transport tools such as ONNX (Open Neural Network Exchange), tflite (TensorFlow Lite) and the like.

Figure 3:
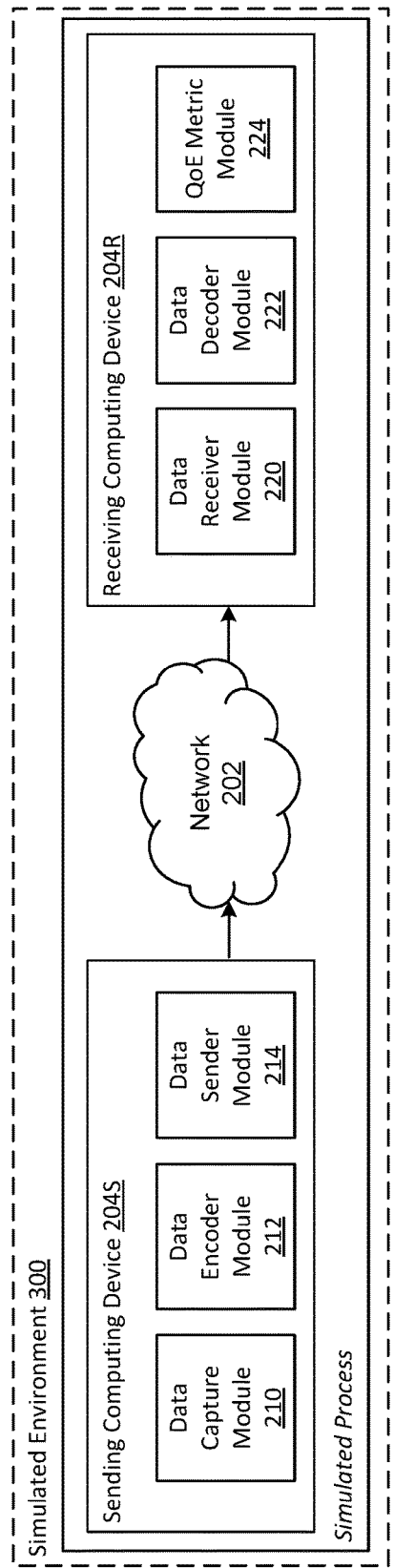
FIG. 3 illustrates a simulated training environment for reinforcement learning to maximize user-perceived quality of experience (QoE) in real-time communications.
Figure 4:
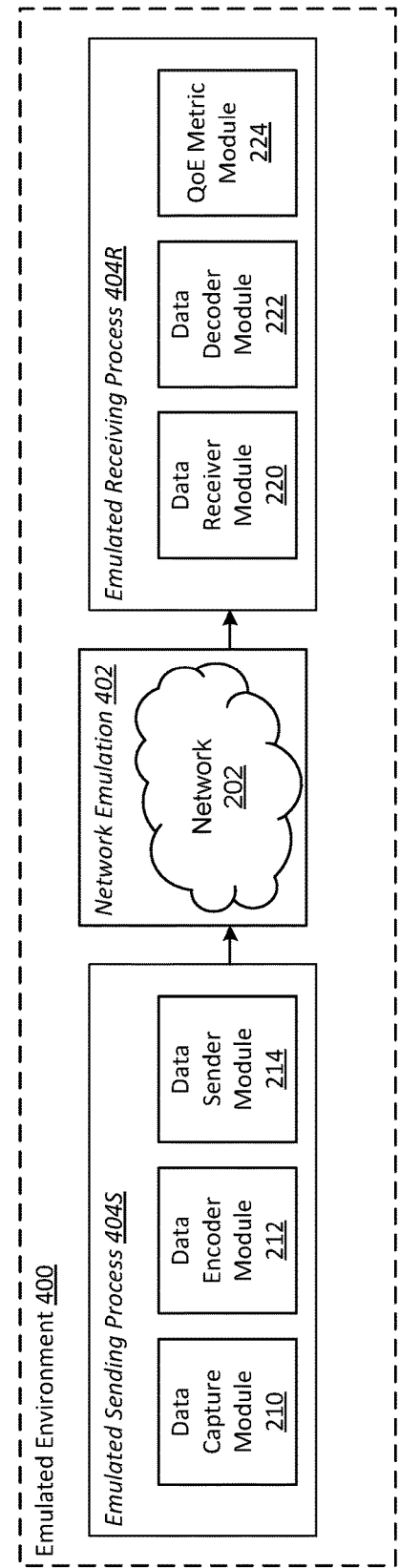
FIG. 4 illustrates an emulated training environment for reinforcement learning to maximize user-perceived QoE in real-time communications.
Figure 5:
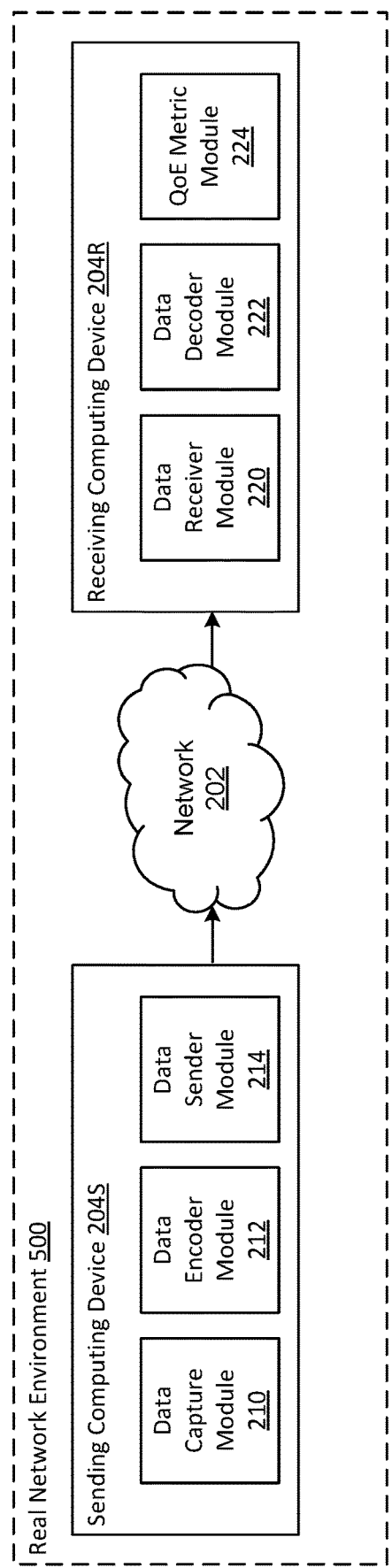
FIG. 5 illustrates a real network training environment for reinforcement learning to maximize user-perceived QoE in real-time communications.

Referring to FIGS. 3-5, the agent 206 can be trained using one or more of a simulated environment 300, an emulated environment 400 and a real network environment 500. Which environment is used depends on the requirement of data collection speed and data variety. In the simulated environment 300 of FIG. 3 all processes of the sending computing device 204S (including processes of the data capture model 210, the data encoder module 212 and the data sender module 214), all processes of the receiving computing device 204R (including processes of the data receiver module 220, the data decoder module 222 and the QoE metrics module 224) and network 202 are simulated. In the emulated environment 400 of FIG. 4, the sending computing device 204S is duplicated in a first emulation comprising an emulation sending process 404S, the receiving computing device 204R is duplicated in a second emulation comprising an emulated receiving process 404R and the network 202 is duplicated in a third emulation comprising a network emulation 402. In certain aspects, a physical sending computing device and a physical receiving computing device can be used in conjunction with an emulated network. In the real network environment 500 of FIG. 5, a physical sending computing device 204S, a physical receiving computing device 204R and physical network 202 are used.

Which of the environments used for training of the agent 206 depends upon data collection speed and data collection variety requirements. For example, network simulation tools, such as ns-2 or ns-3 (which are discrete-event network simulators), can be used in the simulated environment 300 for rapid data collection and training. Network emulation tools, such as NetEm (which is an enhancement of the Linux traffic control facilities that allow the addition of delay, packet loss, duplication and other characteristics of outgoing transmission packets from a selected network interface), can be used in the emulated environment 400 to allow real code to run in a controlled environment. This controlled environment allows communication applications (e.g., Skype, Microsoft Teams, WhatsApp, WeChat and the like) to be tested in an environment with reproducible network conditions. Real networks (e.g., cellular, Wi-Fi, Ethernet and the like) using real internet service providers (ISPs) in the real network environment 500 provide the most realistic test environment and allow online learning of the conditions experienced by end-users. In certain aspects, a same reinforcement learning policy can be used in the simulated, emulated or real network environments, however, each environment will provide a different performance. The agent 206 can, alternatively or additionally, be trained using transfer learning wherein the hand-coded rules that were previously created in reaction to new application requirements and/or network behaviors relative to real-time audio and video data streaming are used to train the agent 206.

Once trained, the agent 206 is applied in a live network environment for real-time audio and video communication. Within the live network, the reinforcement learning model 232 is continuously updated based on the transmission of real-time audio and video data streams from a sending computing device, e.g., device 204S, to a receiving computing device 204R. In certain aspects, a sending computing device, e.g., device 204S, can include a single agent 206 or a plurality of agents 206 that operate to modify the real-time audio and video data transmission parameters with each agent modifying only one data transmission parameter or a plurality of data transmission parameters. In certain aspects, a receiving computing device, e.g. device 204R, can determine one QoE or a plurality of QoEs. The one or plurality of QoEs can be provided to a single agent 206 or a plurality of agents 206.

Accordingly, based on the continuous live updating of the agent 206, the agent 206 and the sending computing device 204S are immediately (e.g. in real-time) updated to continuously optimize expected user-perceived quality in real-time audio and video communications, through maximization of the expected value of the sum of future rewards, rather than suffering degraded real-time audio and video transmissions that would otherwise result in the context of an environment where only hand-coding is used to respond to changes in network conditions and/or changes in application requirements.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, as described herein.

Figure 6:
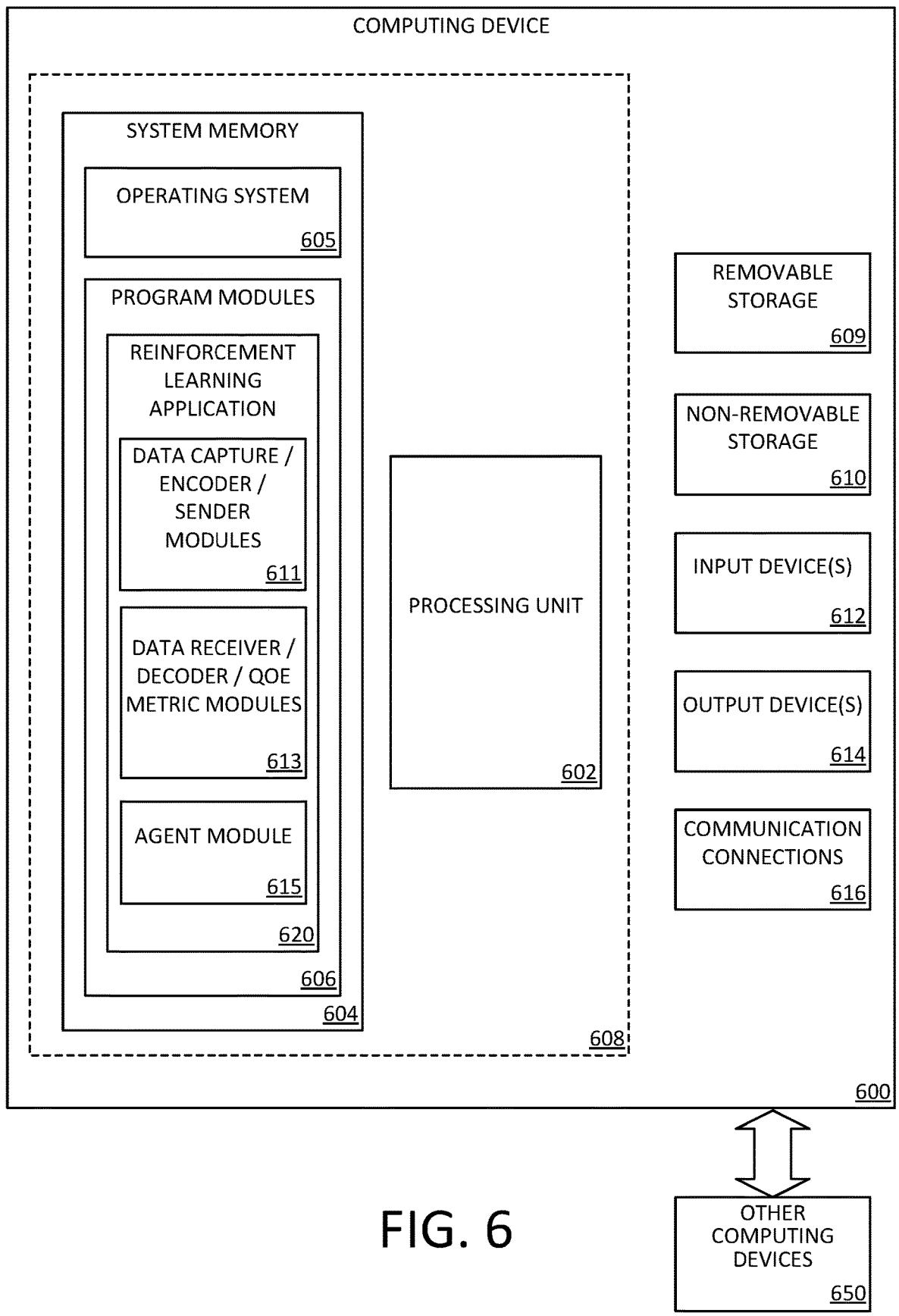
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may have computer executable instructions for implementing reinforcement learning for maximizing user perceived QoE in real-time communications on a computing device (e.g., sending computing device 204S and receiving computing device 204R), including computer executable instructions for reinforcement learning application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606, such as one or more components with regard to FIG. 2 and, in particular, data capture, data encoder, and data sender modules 611 (e.g., data capture module 210, data encoder module 212, and data sender module 214), data receiver, data decoder and QoE metrics modules 613 (e.g., data receiver module 220, data decoder module 222, and QoE metrics module 224), and/or agent module 615 (e.g., agent 206).

The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610. Any number of program modules and data files may be stored in the system memory 604. While executing on the processing unit 602, the program modules 606 (e.g., reinforcement learning application 620) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
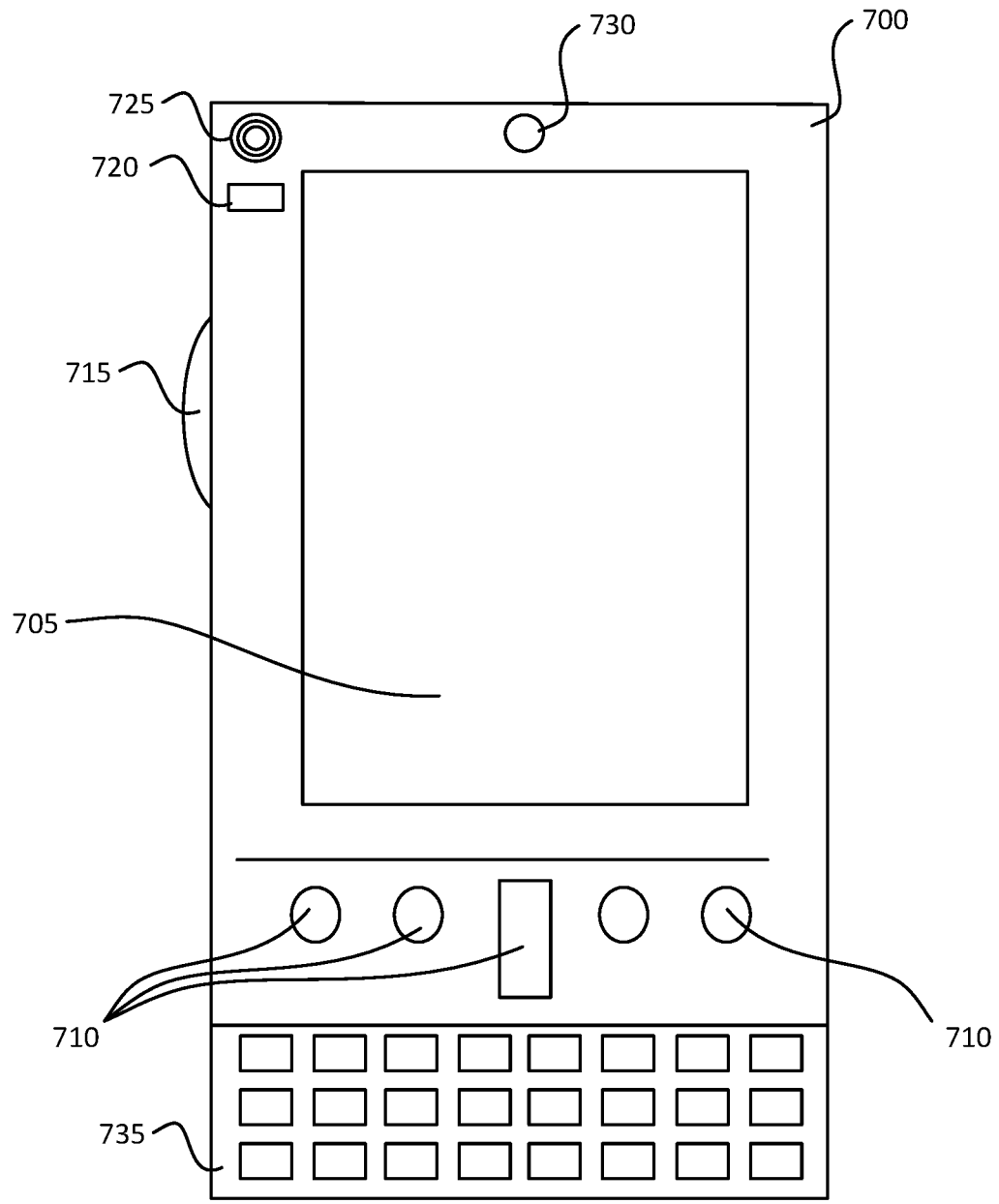
FIGS. 7A and 7B are simplified block diagrams of a mobile computing device with which aspects of the present disclosure may be practiced.
Figure 7B:
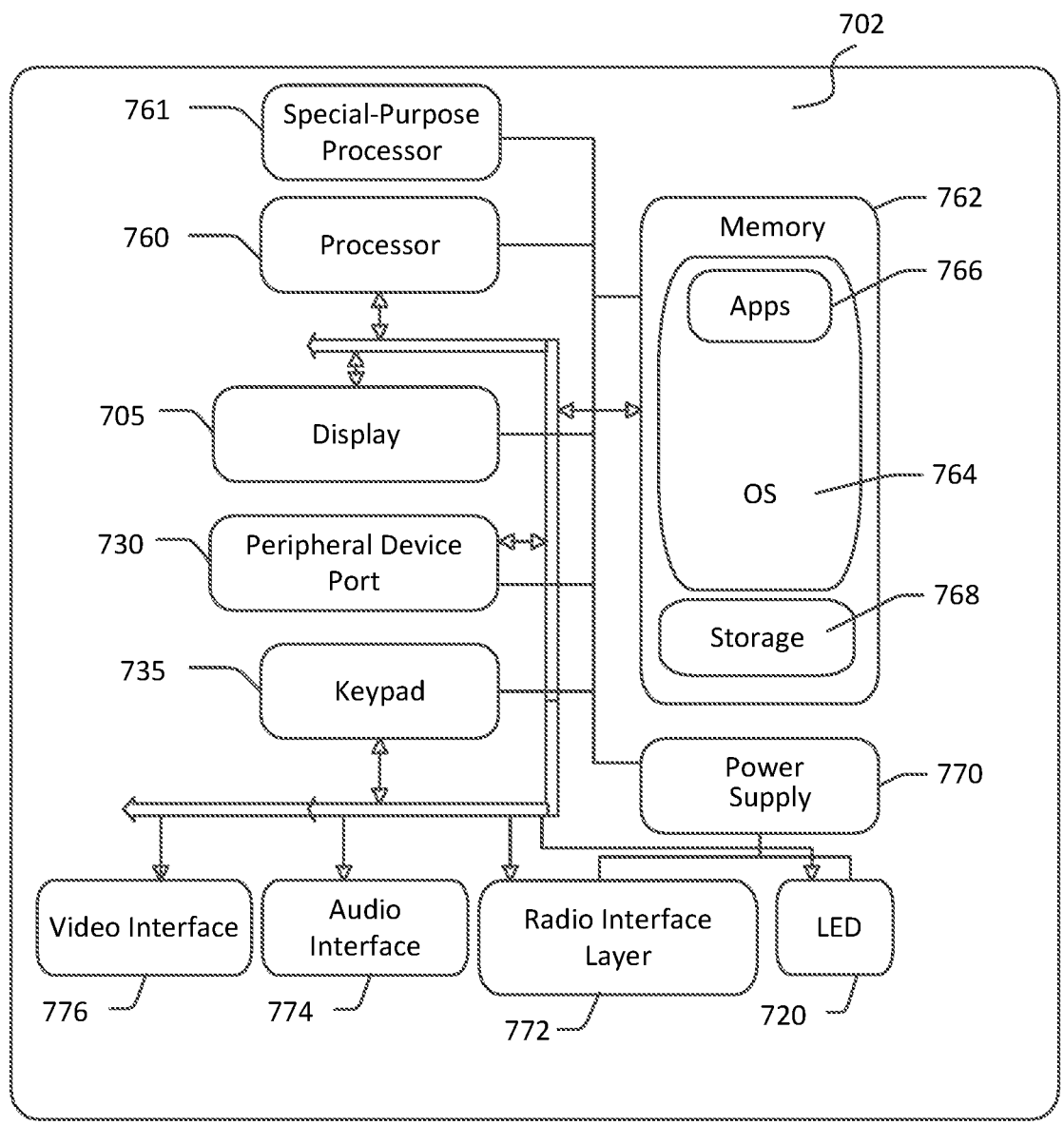

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions for providing a consensus determination application as described herein (e.g., message parser, suggestion interpreter, opinion interpreter, and/or consensus presenter, etc.).

The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 725 (e.g., audio transducer 725 illustrated in FIG. 7A). In the illustrated embodiment, the visual indicator 720 is a light emitting diode (LED) and the audio transducer 725 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of peripheral device 730 (e.g., on-board camera) to record still images, video stream, and the like. Audio interface 774, video interface 776, and keyboard 735 may be operated to generate one or more messages as described herein.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

As should be appreciated, FIGS. 7A and 7B are described for purposes of illustrating the present methods and systems and is not intended to limit the disclosure to a particular sequence of steps or a particular combination of hardware or software components.

Figure 8:
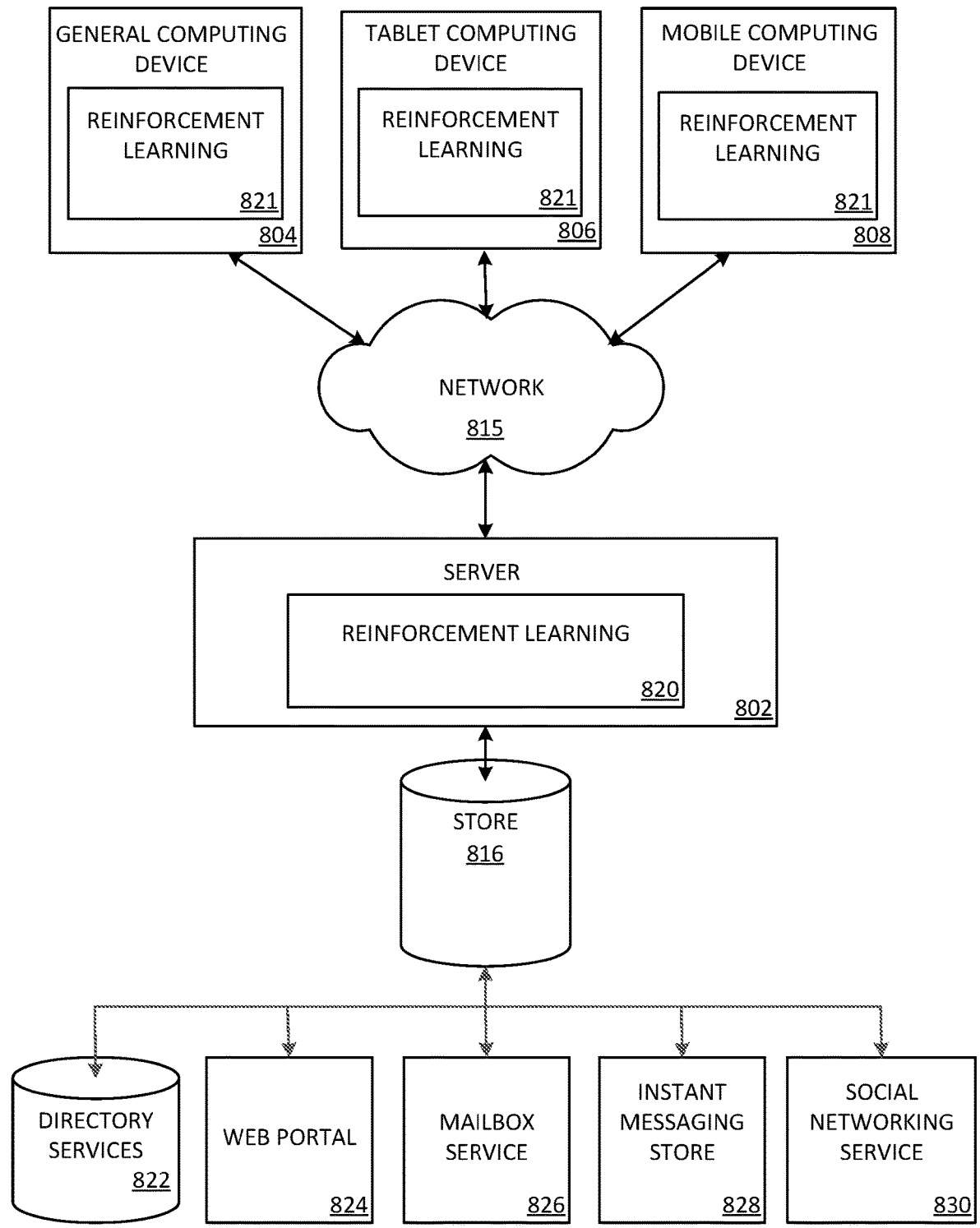
FIG. 8 is a simplified block diagram of a distributed computing system in which aspects of the present disclosure may be practiced.

FIG. 8 illustrates one aspect of the architecture of a system for processing data received at a computing system from a remote source, such as a general computing device 804 (e.g., personal computer), tablet computing device 806, or mobile computing device 808, as described above. Content displayed at server device 802 may be stored in different communication channels or other storage types. For example, various messages may be received and/or stored using a directory service 822, a web portal 824, a mailbox service 826, an instant messaging store 828, or a social networking service 830. The reinforcement learning application 821 may be employed by a client that communicates with server device 802, and/or the reinforcement learning application 820 may be employed by server device 802. The server device 802 may provide data to and from a client computing device such as a general computing device 804, a tablet computing device 806 and/or a mobile computing device 808 (e.g., a smart phone) through a network 815. By way of example, the computer system described above may be embodied in a general computing device 804 (e.g., personal computer), a tablet computing device 806 and/or a mobile computing device 808 (e.g., a smart phone). Any of these embodiments of the computing devices may obtain content from the store 816, in addition to receiving graphical data useable to either be pre-processed at a graphic-originating system or post-processed at a receiving computing system.

As should be appreciated, FIG. 8 is described for purposes of illustrating the present methods and systems and is not intended to limit the disclosure to a particular sequence of steps or a particular combination of hardware or software components.

Figure 9:
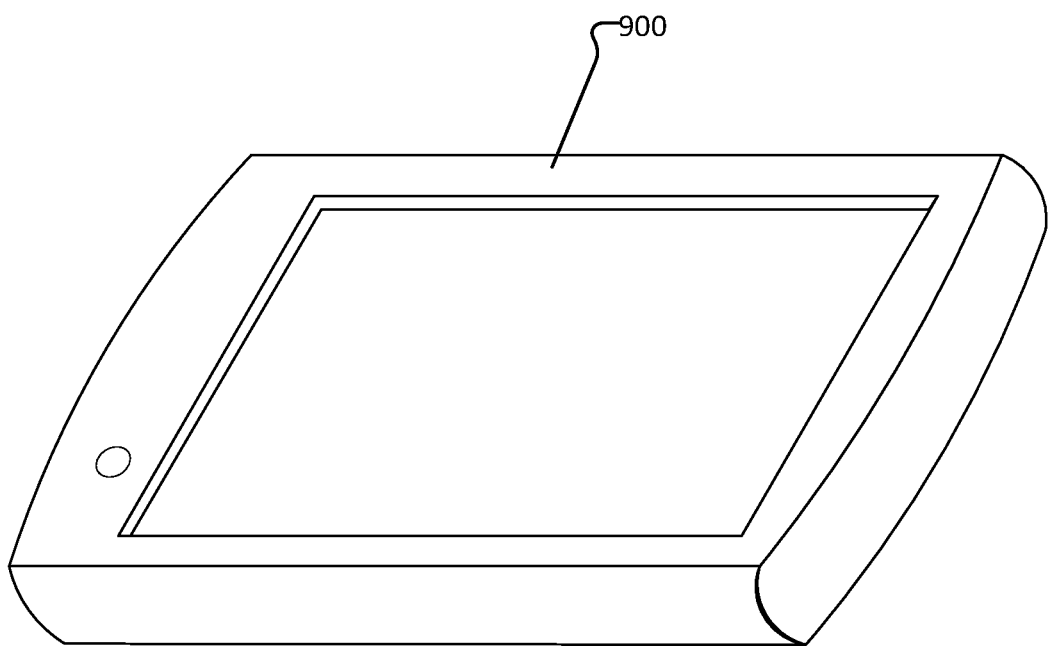
FIG. 9 illustrates a tablet computing device for executing one or more aspects of the present disclosure.

FIG. 9 illustrates an exemplary tablet computing device 900 that may execute one or more aspects disclosed herein.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 9 is described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed:

1. A method of optimizing expected user-perceived quality of experience (QoE) in real-time communications between a sending computing device and a receiving computing device, comprising:
    determining, by an agent of the sending computing device, a current state of the sending computing device based on current state data of the sending computing device and network statistics received from the receiving computing device, the network statistics indicative of a quality of a real-time communication received at the receiving computing device;
    determining, by the agent, a current action of the sending computing device, wherein the current action comprises a plurality of transmission parameters;
    providing, by the agent, the transmission parameters to the sending computing device;
    transmitting, in accordance with the transmission parameters, a real-time communication from the sending computing device to the receiving computing device, wherein the real-time communication includes one or more of a real-time audio communication and a real-time video communication;
    receiving, by the agent, a reward and second network statistics from, and determined by, the receiving computing device, wherein the reward is based on one or more reception parameters associated with the transmitted real-time communication received at the receiving computing device;
    determining, by the agent, based on the current state, the current action, the second network statistics, and the reward, an expected value of a sum of future rewards; and
    changing, by the agent, at least one of the plurality of transmission parameters of the sending computing device to maximize the expected value of the sum of future rewards.

2. The method of claim 1, wherein a state-action value function of a reinforcement learning model determines the expected value of the sum of future rewards.

3. The method of claim 2, further comprising providing an output of the state-action value function to a control policy learning model of the reinforcement learning model and changing, by the control policy learning model, the at least one of the plurality of transmission parameters based on the output of the state-action value function.

4. The method of claim 1, wherein the reward comprises a user-perceived quality of experience (QoE) metric based on the one or more reception parameters associated with the transmitted real-time communication received at the receiving computing device.

5. The method of claim 4, determining the user-perceived QoE with a QoE machine learning model, wherein the QoE machine learning model assesses the payload of the transmitted real-time communication received at the receiving computing device.

6. The method of claim 4, determining the user-perceived QoE with a QoE machine learning model, wherein the QoE machine learning model assesses: a network statistic at the receiving computing device; a receiving computing device statistic; and a user feedback of the transmitted real-time communication received at the receiving computing device.

7. The method of claim 1, wherein the at least one of the plurality of transmission parameters includes a send rate parameter, a resolution parameter, a frame rate parameter, a quantization parameter (QP), or a forward error correction (FEC) parameter.

8. The method of claim 1, wherein the sending computing device additionally operates as a receiving computing device and wherein the receiving computing device additionally operates as a sending computing device for two-way real-time communication.

9. A method of training a reinforcement learning model for optimizing expected user-perceived quality of experience (QoE) in real-time communications, the method including
    determining, by an agent of a sending computing device, a current state of the sending computing device based on current state data of the sending computing device and network statistics received from the receiving computing device, the network statistics indicative of a quality of a real-time communication received at the receiving computing device;
    determining, by the agent, a current action of the sending computing device, wherein the current action comprises a plurality of transmission parameters;
    providing, by the agent, the transmission parameters to the sending computing device;
    transmitting, in accordance with the transmission parameters, a real-time communication from the sending computing device to the receiving computing device, wherein the real-time communication includes one or more of a real-time audio communication and a real-time video communication;

receiving, from the receiving computing device and at the agent, a reward and second network statistics from and determined by the receiving computing device, wherein the reward is based on one or more reception parameters associated with the real-time communication received at the receiving computing device;

determining at the agent, based on the current state, the current action, the second network statistics, and the reward, an expected value of a sum of future rewards; and changing, by the agent, at least one of the plurality of transmission parameters to maximize the expected value of the sum of future rewards.

10. The method of claim 9, wherein the sending computing device receiving computing device, and network are simulated.

11. The method of claim 10, wherein the sending computing device, receiving computing device, and network are simulated with discrete events.

12. The method of claim 9, wherein each of the sending computing device and the receiving computing device execute a communications application and wherein one or more conditions of the network are controlled according to one or more predetermined parameters.

13. The method of claim 9, wherein the network comprises a live, real network.

14. The method of claim 13, wherein the sending computing device, receiving computing device, and network are in a live environment and the method further comprises continuously training the agent based on live real-time communication transmissions.

15. A system to optimize expected user-perceived quality of experience (QoE) in real-time communications, comprising:

a memory storing executable instructions; and a processor executing the executable instructions, which when executed, causes the processing unit to:

determine, by an agent of a sending computing device, a current state of the sending computing device based on current state data of the sending computing device and network statistics received from the receiving computing device, the network statistics indicative of a quality of a real-time communication received at the receiving computing device;

determine, by the agent, a current action of the sending computing device, wherein the current action comprises a plurality of transmission parameters;

provide, by the agent, the transmission parameters to the sending computing device:

transmit, in accord with the transmission parameters, a real-time communication from the sending computing device to a receiving computing device, wherein the real-time communication includes one or more of a real-time audio communication and a real-time video communication;

receive, by the agent and from the receiving computing device, a reward and second network statistics from and determined by the receiving computing device, wherein the reward is based on a parameter associated with the transmitted real-time communication received at the receiving computing device;

determine, by the agent, based on the current state, the second network statistics, the current action, and the reward, an expected value of a sum of future rewards; and change, by the agent, at least one of the plurality of transmission parameters of the sending computing device to maximize the expected value of the sum of future rewards.

16. The system of claim 15, further comprising operating the sending computing device as a receiving computing device for two-way real-time communication.

17. The system of claim 15, wherein the at least one of the plurality of transmission parameters includes a send rate parameter, a resolution parameter, a frame rate parameter, a quantization parameter (QP), or a forward error correction (FEC) parameter.

18. The system of claim 15, further comprising performing the determination of the expected value of the sum of future rewards with a reinforcement learning model.

19. The system of claim 18, wherein the reinforcement learning model comprises an actor-critic model, a q-learning model, a policy gradient model, a temporal difference model, or a monte-carlo tree search model.

* * * * *